United States Patent Office 3,632,557
Patented Jan. 4, 1972

3,632,557
VULCANIZABLE SILICON TERMINATED POLYURETHANE POLYMERS
George L. Brode, Bridgewater, and Louis B. Conte, Jr., Newark, N.J., assignors to Union Carbide Corporation, New York, N.Y.
No Drawing. Continuation-in-part of abandoned application Ser. No. 623,532, Mar. 16, 1967. This application Sept. 18, 1968, Ser. No. 760,660
Int. Cl. C08g 22/32, 22/04
U.S. Cl. 260—77.5 TB
28 Claims

ABSTRACT OF THE DISCLOSURE

A room temperature curable silicon terminated organic polymer comprising an isocyanate terminated polyurethane prepolymer containing at least two urethane linkages per polymer molecule, wherein the isocyanate terminal groups have been reacted with an organosilicon compound to terminate, that is cap or endblock said polymers with organosilicon groups.

BACKGROUND OF THE INVENTION

This application is a continuation-in-part of our copending U.S. application Ser. No. 623,532, filed Mar. 16, 1967 and now abandoned.

This invention relates to vulcanizable silicon terminated organic polymers containing at least two urethane linkages. More particularly this invention relates to room temperature curable silicon terminated organic polymers comprising an isocyanate terminated polyurethane prepolymer containing at least two urethane linkages per polymer molecule, wherein the isocyanate terminal groups have been reacted with an organosilicon compound to terminate, that is cap or end-block, said polymers with organosilicon groups.

The instant one component room temperature vulcanizable (hereinafter abbreviated as RTV) polymers of this invention have a decided advantage over multi-component RTV systems in that they do not suffer the drawbacks and difficulties encountered in on-site mixing of viscous materials, often of different viscosities, which once mixed must be used quickly before they become unmanageable and wasted.

SUMMARY OF THE INVENTION

Broadly, the present invention provides one component RTV silicon terminated organic polymers which will cure upon exposure to atmospheric moisture comprising an isocyanate terminated prepolymer containing at least two urethane linkages per polymer molecule wherein the isocyanate terminal groups have been reacted and capped with a trifunctional organosilicon compound having a reactive hydrogen atom capable of reacting with the isocyanate terminal groups to produce trifunctional silicon terminal end-blocking groups for said RTV polymers.

More specifically, the vulcanizable silicon terminated organic polymers of this invention are those comprising an isocyanate terminated polyurethane prepolymer having at least two urethane linkages per polymer molecule, wherein the isocyanate terminal groups have been reacted with a silicon compound of the formula:

$$(RO_3)-Si-R'-Z-H$$

wherein R is a lower alkyl radical of from 1 to 6 carbon atoms; wherein R' is a divalent bridging radical selected from the groups consisting of a divalent hydrocarbon radical, a divalent hydrocarbon ether radical and a divalent hydrocarbon amino radical; and wherein Z is a member selected from the group consisting of —S— and —NR''— where R'' is H or a lower alkyl radical of from 1 to 6 carbon atoms, to provide trialkoxy terminal end-blocking groups for said vulcanizable polymers which are bonded to the polyurethane prepolymer through a produced urea $$\begin{matrix} O \\ \| \\ -NR''-C-NH- \end{matrix}$$

linking group or thiourethane $$\begin{matrix} O \\ \| \\ -S-C-NH- \end{matrix}$$

linking group.

Thus the vulcanizable polymers and their preparation can be graphically shown as follows:

$$O=C=N-\begin{bmatrix}\text{Polyurethane}\\\text{containing at least}\\\text{two urethane linkages}\\\text{per polymer molecule}\end{bmatrix}-N=C=O$$

$$+$$

$$2(RO)_3-Si-R'-Z-H$$

$$(RO)_3Si-R'-Z-\overset{O}{\overset{\|}{C}}-\overset{H}{\overset{|}{N}}-\begin{bmatrix}\text{Polyurethane}\\\text{containing at least}\\\text{two urethane linkage}\\\text{per polymer molecule}\end{bmatrix}-\overset{H}{\overset{|}{N}}-\overset{O}{\overset{\|}{C}}-Z-R'-Si-(OR)_3$$

wherein R, R' and Z are the same as defined above.

DESCRIPTION OF THE PREFERRED EMBODIMENTS

The isocyanate terminated polyurethane prepolymers useful in the present invention are prepared by reacting a mole excess of organic polyisocyanate with one or more polyols as is well known in the art. A summary of urethane polymer chemistry and technology can be found in Polyurethanes: Chemistry and Technology, Saunders and Frisch, Interscience Publishers (New York, 1963 (Part I) and 1964 (Part II).

Any suitable organic polyisocyanate, either aliphatic, cycloaliphatic, araliphatic or aromatic, may be used. Suitable organic polyisocyanates include meta-phenylene diisocyanate, paraphenylene diisocyanate, 2,4-tolylene diisocyanate, 2,6-tolylene diisocyanate, 4,4'-diphenylmethane diisocyanate, benzidine diisocyanate, naphthalene-1,5-diisocyanate, hexamethylene diisocyanate, 4,4'4''-triphenylmethane triisocyanate, decamethylene diisocyanate, polyphenylmethylene polyisocyanates that are produced by phosgenation of aniline/formaldehyde condensation products, dianisidine diisocyanate, xylylene diisocyanate, bis(2-isocyanatoethyl)fumarate, bis(2 - isocyanatoethyl) cyclohex-4-ene-1,2-dicarboxylate, bis(2 - isocyanatoethyl) carbonate, and many other organic polyisocyanates known in the art, which as those disclosed by Siefken, Annalen, 565, 122–135 (1949).

In producing the isocyanate terminated polyurethane prepolymers of the present invention, one or more polyhydroxy compounds or polyols can be employed in the reaction with the organic polyisocyanate.

Illustrative polyhydroxy compounds include the following classes of compounds:

(a) lactone polyols and the alkylene oxide adducts thereof;
(b) the polyester polyols, and the alkylene oxide adducts thereof;
(c) the polyoxyalkylene polyols and polyoxycycloalkylene polyols, and the alkylene oxide adducts thereof;
(d) the non-reducing sugars and sugar derivatives and the alkylene oxide adducts thereof;
(e) the alkylene oxide adducts of polyphenols;
(f) the polytetramethylene glycols;

(g) the functional glycerides, such as castor oil;
(h) polyhydroxy polysulfide polymers;
(i) hydroxyl terminated extended lactone polyesters prepared by phosgenating a lactone polyester with a polyol such as bisphenol A, and the like.

The term "alkylene oxide" includes, for example, ethylene oxide, 1,2-epoxypropane, 1,2-epoxybutane, 2,3-epoxybutane, isobutylene oxide, epichlorohydrin, and the like and mixtures thereof.

Lactone polyols are prepared by reacting a lactone such as epsilon-caprolactone or a mixture of epsilon-caprolactone and an alkylene oxide with a polyfunctional initiator such as polyhdric alcohol. The term "lactone polyols" also includes the various "copolymers" such as lactone copolyesters, lactone polyester/polycarbonates, lactone polyester/polyethers, lactone polyester/polyether/polycarbonates, and the like. Useful lactone polyols, their preparation and properties are more fully described in U.S. Pats. 2,878,236, 2,890,208, 2,933,477–8 and 3,169,945.

Polyester polyols are esterification products which range from liquids to non-crosslinked solids, i.e., solids which are insoluble in many of the more common inert normally liquid organic media, and which are prepared by the reaction of monocarboxylic acids and/or polycarboxylic acids, their anhydrides, their esters, or their halides, with a stoichiometric excess of a polyol. Illustrative of the polycarboxylic acids which can be employed to prepared the polyester polyols preferably include dicarboxylic acids and tricarboxylic acids, such as maleic acid, succinic acid, glutaric acid, adipic acid, pimelic acid, suberic acid, azelaic acid, sebacic acid, chlorendic acid, 1,2,4-butanetricarboxylic acid, phthalic acid, and the like, while the esterification reaction is well known in the art.

Polyoxyalkylene polyols include alkylene oxide adducts of, for example, water, ethylene glycol, diethylene glycol, propylene glycol, dipropylene glycol, gycerol, 1,2,6-hexanetriol, 1,1,1-trimethylol ethane or propane pentaerythritol, sorbitol, sucrose, lactose, alpha-methylglucoside, alpha-hydroxyalkylglucoside, and the like. The alkylene oxides employed in producing polyoxyalkylene polyols normally have from 2 to 4 carbon atoms. Ethylene oxide, propylene oxide and mixtures of propylene oxide with ethylene oxide are preferred. Such polyalkylene polyols are well known in the art.

Illustrative of the non-reducing sugars and sugar derivatives contemplated are sucrose, the alkyl glucosides such as methylglucoside, ethyl glucoside, and the like; the polyol glucosides such as ethylene glycol glucoside, propylene glycol glucoside, glycerol, glucoside, 1,2,6-hexanetriol glucoside, and the like; and the alkylene oxide adducts thereof.

Alkylene oxide adducts of polyphenols include those in which the polyphenol can be bisphenol A; bisphenol F; the condensation products of phenol and formaldehyde, more particularly the novolac resins; the condensation products of various phenolic compounds and acrolein, the simplest members of this class being the 1,1,3-tris(hydrophenyl)propanes; the condensation products of various pheneolic compounds and glyoxal, glutaraldehyde, and other dialdehydes, the simplest members of this class being the 1,1,2,2-tetrabis(hydroxyphenyl)ethanes, and the like.

Another useful class of polyols is the polytetramethylene glycols, which are prepared by polymerizing tetrahydrofuran in the presence of the acidic catalyst. Also, useful are castor oil and alkylene oxide adducts of castor oil.

Suitable polyhydroxy polysulfide polymers have the formula

HO—R—SS(R′SS)n R—OH wherein R and R′ are divalent aliphatic radicals wherein the carbon chain may be interrupted by oxygen atoms and n is an integer having a value of from 1 to 100, which can be prepared by reacting a dihalo-organic compound such as Cl—R′—Cl, a chlorohydrin such as Cl—R′—OH and an inorganic polysulfide.

The polyol or polyol mixture employed can have hydroxyl numbers which vary over a wide range. In general, the hydroxyl numbers of the polyols employed in the invention can range from about 20, and lower, to about 1000, and hgher, preferably, from about 30 to about 800, and more preferably from about 35 to about 700. The hydroxyl number is defined as the number of milligrams of potassium hydroxide required for the complete neutralization of the hydrolysis product of the fully acetylated derivative prepared from 1 gram of polyol. The hydroxyl number can also be defined by the equation:

$$OH = \frac{56.1 \times 1000 \times f}{M.W.}$$

where

OH = hydroxy number of the polyol
$f$ = average functionality, this is average number of hydroxyl groups per molecule of polyol
M.W. = average molecular weight of the polyol.

The most preferred polyisocyanates are alkylene diisocyanates and aromatic diisocyanates, especially tolylene diisocyanate, while the most preferred polyols are the diols of polyalkylene glycols and the diols of polycaprolactones.

As pointed out above to prepare the isocyanate terminated polyurethane prepolymers useful in this invention, at least a slight mole excess of —NCO equivalents (groups) with respect to the hydroxyl equivalents (groups) is employed to end-block the polymer chain with isocyanate groups. Of course, it should be understood that as well as employing a single type of polyisocyanate compound and a single type of polyol compound mixtures of various isocyanates as well as mixtures of various polyols may be used if desired. Furthermore, it should also be clear that the backbone of the isocyanate terminated prepolymers comprises at least one unit and more preferably repeating units of the formula

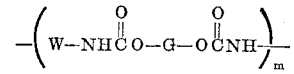

wherein G represents the residue on removal of the terminal OH groups from the hydroxy terminal polyol employed; wherein W represents a divalent hydrocarbon radical and wherein $m$ is an integer of at least one. Thus, the backbone of said prepolymers are free from other types of repeating units such as urea and the like.

For purposes of the present invention, useful isocyanate terminated polyurethanes will have a molecular weight that is governed by their intended end use. In solvent-free systems, the polymers should not be too viscous and generally have a molecular weight of from about 2,000 to about 20,000 preferably from about 4,000 to about 14,000. In solvent systems viscosity problems can be avoided and molecular weights greater than 20,000 can be used provided there is a sufficient concentration of hydrolyzable end groups to form a three-dimensional, cross-linked network upon curing. Where a solvent is employed, it should be inert with respect to the polymer and volatile under the curing conditions.

Suitable organosilicon compounds containing a reactive hydrogen atom capable of reacting with the isocyanate terminal groups of the polyurethane prepolymer are those silicon compounds of the formula

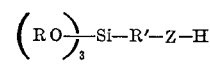

wherein R is a lower alkyl radical of from 1 to 6 carbon atoms such as methyl, ethyl, propyl, butyl, t-butyl, pentyl, hexyl and the like; wherein R′ is a divalent hydrocarbon radical, a divalent hydrocarbon ether radical having not more than one ether oxygen atom attached to any one carbon atom therein, or a divalent hydrocarbon amine radical having not more than one secondary or tertiary amino grouped attached to any one carbon atom therein, wherein all the hydrocarbon radicals are free of aliphatic unsaturation and contain from 1 to 18 carbon atoms, such as methylene, ethylene, propylene, butylene, octa-decylene, cyclopentylene, cyclohexylene, phenylene, naphthylene, tolyene, xylylene, benzylene, 2-phenylpropylene,

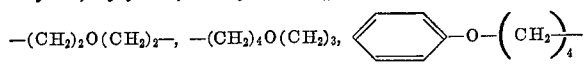

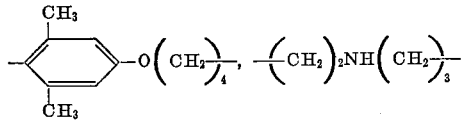

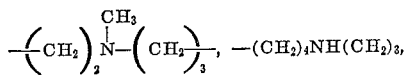

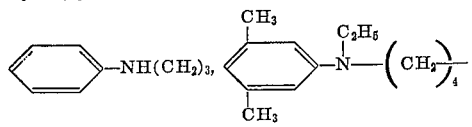

and the like; where Z is a member selected from the group consisting of —S— and —NR''—, wherein R'' is a hydrogen atom or a lower alkyl radical of from 1 to 6 carbon atoms. Such organosilicon compounds and methods for their preparation are well known in the art. Moreover, it is to be understood that each R may be the same or different for any given silicon compound. The most preferred organosilicon compounds are those wherein R is methyl, ethyl or propyl, wherein R' is a divalent lower alkylene radical of from 1 to 8 carbon atoms and wherein Z is —S—, —NH—, —NCH$_3$— or —NC$_2$H$_5$—.

The vulcanizable silicon terminated polymers of this invention can be prepared by reacting about a stoichiometric amount of an isocyanate terminated polyurethane prepolymer with about a stoichiometric amount of an organic silicon compound as graphically outlined above. Thus, each mole of isocyanate terminate polyurethane prepolymer requires at least two moles or organosilicon compound for complete reaction. Generally, it is preferred to employ a slight mole excess of organosilicon compound to insure complete reaction of all of the isocyanate terminal groups present on the prepolymer. Normally the reaction is conducted in the absence of moisture and at temperatures, for example, ranging from 0° C. to 150° C. or higher if desired, preferably about 20° C. to 100° C., with mixing to insure good contact between the reactants. The exclusion of moisture during the reaction is preferred. Moreover, an inert diluent can be employed to facilitate the reaction if desired. While the reaction is usually conducted at atmospheric pressure, super- or sub-atmospheric pressures may be also used if desired. Of course, different types of organosilicon compounds can be employed if desired so that the same vulcanizable polymer can be terminated with different organosilicon compounds.

The most preferred vulcanizable polymers of this invention are those silicon terminated polymers having the general formula

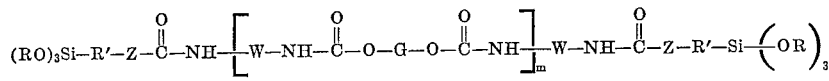

wherein R is lower alkyl radical of from 1 to 6 carbon atoms; wherein R' is a divalent alkylene radical of from 1 to 8 carbon atoms; wherein Z is —S—, —NH—, NCH$_3$— or —NC$_2$H$_5$—, preferably —NH—; wherein W is a divalent alkylene radical of from 1 to 18 carbon atoms or a divalent aromatic radical of from 6 to 18 carbon atoms; wherein G represents the residue on removal of the terminal OH groups from a polyoxyalkylene glycol having a molecular weight of from about 580 to about 5800 and mixtures thereof or a polyhydroxypolycaprolactone having a molecular weight of from about 450 to about 4500 and mixtures thereof, and wherein m is an integer of at least one, said silicon terminated polymers having a molecular weight of from about 4,000 to about 20,000 when G is said residue of a polyalkylene glycol and from about 2,000 to about 20,000 when G is a said residue of a polyhydroxypolycaprolactone.

The polymers of this invention vulcanize or cure into a cross-linked, three-dimensional network upon exposure to moisture. The curing mechanism is believed to be as follows: the hydrolyzable alkoxy groups are replaced with hydroxyl groups and cross-linking takes place through the condensation of pairs of SiOH groups to siloxane linkages (Si—O—Si) or by the reaction of SiOH groups with SiO-alkoxy groups to form a siloxane linkage and an alcohol.

The rate to hydrolysis (cure rate) will depdent on atmospheric temperature, relative humidity and the like. Thus, the cure rate can be accelerated by the use of water or water vapor and/or elevated temperatures. Obviously, the vulcanizable polymers of this invention should be maintained out of contact with water (under anhydrous conditions) until actual use.

Since the hydrolysis and condensing, this is cross-linking, of the instant vulcanizable polymers is moderate in cure rate, it is generally preferred to employ a catalyst. Any well know silanol condensation catalyst may be employed, for example, alkyl titanates, organosilicon titanates, metal salts of carboxylic acids such as stannous octoate, dibutyltin diluarate and the like, amine salts such as dibutylamine-2-ethylhexoate and the like, or other conventional acidic and basic catalysts. When employed, the silanol condensation catalysts, are used in an amount sufficient to cure the polymer upon exposure to moisture, for example from about 25 to about 500 parts by weight per million parts by weight of the polymer, of course lower or higher amounts of catalyst may be employed. Moreover, the catalysts can be added during or after the preparation of the polymers.

The polymers of this invention can also be modified by incorporating therein any of the conventional elastomer fillers, e.g. reinforcing fillers, such as fume silicas, silica aerogels and precipitated silicas of high surface area. Non-reinforcing fillers can also be used, for example, coarse silicas, such as diatomaceous earth, crush quartz or metallic oxides, such as titania, ferric oxide, zinc oxide, talc and the like. In addition fibrous fillers such as asbestos or glass fibers or filaments may be used. In all cases, it is desirable that the filler be substantially dry before admixed with the polymers. The fillers are generally employed to upgrade physical properties and to modify the flow characteristics of the uncured polymer. The polymers of this invention may also contain modifiers such as resinous siloxane modifiers as plasticizers or to make the polymers more dough-like and less resilient, as well as additives such as pigments, UV stabilizers, oxidation inhibitors and the like or dielectric substances such as graphite and carbon black. It is immaterial whether these fillers, modifiers or additives and the like are added to the polymers of this invention during or after their preparation as described herein. However, it is most preferable that they be added under substantially anhydrous conditions.

The vulcanizable polymers of this invention are useful in coating applications and in caulking and sealing applications on buildings, airplanes, bathroom fixtures, automotive equipment and the like, and as encapsulating and potting compounds. One desirable feature is their ability to be applied to moist or wet surfaces and be cured into a cross-linked elastomer without deleterious effects, which cured product becomes tack-free within a relatively short period of time. Moreover, the cured polymers of this invention strongly adhere alone or with the aid of a primer to a wide variety of substrates such as glass, porcelain, wood, metals, polymeric materials and the like making them especially suited for any type of caulking, adhesive or laminating application. Another use for the vulcanizable polymers of this invention is in food packaging. A food item such as fruit or the like may be coated with a polymer of this invention by dipping or spraying or by like techniques and then exposed to steam or warm water to effect a rapid cure. The coating can then be pealed off for access to the food items when desired.

The instant vulcanizable polymers will remain stable under anhydrous storage conditions for long periods of time. Moreover, the alkoxy hydrolyzable groups on the terminal silicon atom of the vulcanizable polymers of this invention are decidedly preferable to other well known hydrolyzable groups. For instance, the alkoxy groups yield an inert by-product of alcohol upon curing in the presence of moisture while other hydrolyzable groups yield undesirable active by-products which may produce deleterious effects such as staining of the substrate with which the polymer has been cured in contact with or give off a gaseous by-product or an undesirable odor during curing. Moreover, the alkoxy groups do not hydrolyze too fast or too slow thereby allowing for greater handling of the polymer and greater control over the rate of cure for on-the-job type curing operations. Moreover, the instant alkoxy silicon capped polymers are thermally stable under anhydrous conditions and do not dimerize or trimerize to higher molecular weights upon storage as is the case with some other capped systems.

The following examples are illustrative of the present invention and are not to be regarded as limiting. It is to be understood that all parts, percentages and proportions referred to herein and in the appended claims are by weight unless otherwise indicated.

EXAMPLE I

General procedure

Polyoxypropylene glycol (POPG) is charged to a two liter, three-neck round bottom flask equipped with a mechanical stirrer, thermometer, drying tube and nitrogen inlet tube. If a filler is used, it may be charged at this point. The system is dehydrated either by heating at sub-atmospheric pressure, or an excess of diisocyanate is added to react with adventitious water. Then an excess of 2,4-tolylene diisocyanate (TDI) is added along with 200 p.p.m. dibutyltin dilaurate catalyst and the mixture heated at the temperature and for the time indicated in Table I.

Thereafter, isocyanate content of polyurethanes is determined by the di-n-butylamine method in tolylene/isopropanol using bromocresol green indicator. The polyurethanes are sampled by forcing the viscous product through a tared goose-neck tube with nitrogen pressure. Table I summarizes the results of the isocyanate terminated polyurethane preparations.

TABLE I

| POPG molecular weight | POPG hydroxyl number | Moles TDI | Polyurethane molecular weight | Reaction time, hours | Reaction temp., °C. | Percent —NCO reacted |
|---|---|---|---|---|---|---|
| 1,025 | 104.1–115.3 | 11 | 12,273 | 0.25 | 90 | 93.1 |
| 1,025 | 104.1–115.3 | 11 | 12,273 | 1 | 90 | 94.2 |
| 1,025 | 104.1–115.3 | 11 | 12,273 | 2 | 90 | 98.0 |
| 1,025 | 104.1–115.3 | 11 | 12,273 | 3 | 90 | 99.7 |
| 2,025 | 54.7–57.5 | 7 | 13,500 | 2 | 90 | 96.1 |
| 2,025 | 54.7–57.5 | 7 | 13,500 | 3 | 90 | 98.9 |
| 2,025 | 54.7–57.5 | 7 | 13,500 | 1 | 90 | 67.2 |

Isocyanate terminated polyurethanes prepared according to the general procedure are then reacted with gamma-aminopropyltrimethoxysilane (APMS) at the temperature and for the time indicated in the tables below. A curing catalyst is then admixed with the polymer product and the mixture placed in pre-dried containers and tubes. Exposure to atmospheric moisture causes the systems to gel (become tack-free) in three to twelve hours depending on relative humidity and temperature. Data on the preparation of the silane terminated polymers and the physical properties of the uncured and cured polymers is given in the following tables. Tensile properties were determined according to ASTM D–638 obtained from 10–20 mil films drawn on tin plates and removed by mercury amalgamation.

TABLE II

Isocyanate terminated polyurethane (molecular weight 11,400)
Prepared from POPG (molecular weight 2,025) and an excess of DTI and reacted with APMS

| Urethane-APMS reaction time (hours)/temp. (° C.) | Catalyst Urethane preparation (p.p.m.) | Catalyst Polymer cure (percent) | Filler, percent | Percent excess silane | 100% tensile modulus (p.s.i.) | Tensile strength (p.s.i.) | Percent elongation at break | Days exposed |
|---|---|---|---|---|---|---|---|---|
| 3/70 | DTL[1] (200) | DTA (.5) | None | 5.0 | 80 / 88 | 110 / 130 | 160 / 150 | 12 / 21 |
| 3/70 | DTA[2] (200) | DTA (.5) | None | 2.0 | 87 / 92 | 140 / 150 | 180 / 200 | 16 / 27 |
| 3/70 | DTL (200) | DTA (.5) | [3] 23 | 5.0 | 300 / (160) / 377 | 410 / 140 | 160 / 140 | 12 / 26 |
| 3/90 | DTL (200) | DTL (1.0) | 23 | [4] None | 270 / 237 | 340 / 355 | 150 / 220 | 14 / 42 |

[1] DTL=dibutyl tin dilaurate.
[2] DTA=dibutyl tin acetate.
[3] Filler is 90/10 ZnO-talc mixture.
[4] Control.

TABLE III

Isocyanate terminated polyurethane (molecular weight 13,500) prepared from POPG (molecular weight 2,025) and an excess of TDI and reacted with APMS

| Urethane-APMS reaction time (hours)/temp. (° C.) | Catalyst Urethane preparation (p.p.m.) | Catalyst Polymer cure (percent) | Percent excess silane | 100% tensile modulus (p.s.i.) | Tensile strength (p.s.i.) | Percent elongation at break | Days exposed | Remarks |
|---|---|---|---|---|---|---|---|---|
| 3/90 | DTL[1] (200) | DTL (.5%) | 5.0 | 50 | 145 | 330 | 9 | Viscosity at 70° C.=55,300 cps. |
| 3/90 | DTL | See remarks | 5.0 | 40 | 122 | 325 | 9 | All catalyst added initially (0.5%). |
| 3/90 | DTL | do | 10.0 | 37 | 150 | 390 | 9 | |
| 3/90 | DTL (200) | DTL (.75%) | 3.0 | 120 / 110 | 220 / 200 | 190 / 230 | 5 / 21 | Based on POPG plus 1 mole polyoxypropylenetriol. |

[1] DTL=dibutyl tin dilaurate.

TABLE IV

Isocyanate Terminated Polyurethane (Molecular Weight 13,500) Prepared from POPG (Molecular Weight 2025) and an Excess of TDI and Reacted with APMS

| Urethane-APMS reaction time (hours)/temp. (° C.) | Catalyst | | Percent excess silane | Filler | 100% tensile modulus (p.s.i.) | Tensile strength (p.s.i.) | Percent elongation at break | Days cured | Remarks |
|---|---|---|---|---|---|---|---|---|---|
| | Urethane preparation (p.p.m.) | Polymer cure (percent) | | | | | | | |
| 14/90 | DTL[1] (500) | DTL (.75%) | 3.0 | 5% silica | 215 | 340 | 210 | 3 | Based on POPG plus 1 mole polyoxypropylene triol. |
| | | | | | 110 | 270 | 218 | 21 | |
| | | | | | 123 | 315 | 235 | 15 | |
| 13/90 | DTL (500) | DTA[2] (.50%) | 3.0 | 22% TiO₂-talc 4% silica. | 246 | 307 | 185 | 22 | |
| 8/70 | DTL (500) | DTA (.50%) | 0 | 22% ZnO-talc, 2% silica. | 189 | 275 | 240 | 7 | |
| 4/70 | DTL (200) | DTA (.50%) | 5.0 | 22% ZnO-talc | 280 | 400 | 190 | 10 | |
| | | | | | 265 | 360 | 190 | 24 | |

[1] DTL=dibutyl tin dilaurate.
[2] DTA=dibutyl tin acetate.

TABLE V

Isocyanate terminated polyurethane (molecular weight 15,600) prepared from POPG (molecular weight 2,025) and an excess of TDI and reacted with APMS

| Urethane-APMS reaction time (hours)/temp. (° C.) | Catalyst | | Percent excess silane | 100% tensile modulus (p.s.i.) | Tensile strength (p.s.i.) | Percent elongation at break | Days exposed | Remarks |
|---|---|---|---|---|---|---|---|---|
| | Urethane preparation (p.p.m.) | Polymer cure percent | | | | | | |
| 3/90 | DTL[1] (200) | DTL (1%) | 5.0 | 165 | 270 | 220 | 5 | Included 23% filler (90/10 zinc oxide-talc). |
| | | | | 175 | 280 | 240 | 14 | |
| | | | | 185 | 275 | 190 | 27 | |
| 3/90 | DTL (200) | DTL (1%) | 5.0 | 215 | 300 | 200 | 18 | Included 23% filler (talc). |

[1] DTL=dibutyl tin dilaurate.

TABLE VI

Isocyanate terminated polyurethane (molecular weight 12,000) prepared from POPG (molecular weight 2,025) and an excess of TDI and reacted with APMS

| Urethane-APMS reaction time (hours)/temp. (° C.) | Catalyst | | Percent excess silane | 100% tensile modulus (p.s.i.) | Tensile strength (p.s.i.) | Percent elongation at break | Days exposed | Remarks |
|---|---|---|---|---|---|---|---|---|
| | Urethane preparation (p.p.m.) | Polymer cure (percent) | | | | | | |
| 3/90 | DTL[1] (200) | DTL (.5) | 5.0 | 110 | 170 | 185 | 14 | |
| 3/90 | DTL (200) | DTA[2] (.5) | 5.0 | 111 | 174 | 220 | 14 | |
| 3/90 | DTL (200) | DTL (.5) | 10.0 | 48 | 200 | 320 | 11 | |
| 3/90 | DTL (200) | DTL (.5) | 5.0 | 325 | 360 | 125 | 7 | 23% filler (10/90 ZnO, talc). |
| | | | | 280 | 340 | 145 | | |
| 4/90 | DTL (200) | DTL (.5) | [3] None | 210 | 320 | 210 | 1 | Do. |
| | | | | 270 | 405 | 240 | 34 | |
| 3/90 | DTL (200) | DTL (.5) | None | 120 | 350 | 270 | 1 | Do. |
| | | | | 310 | 450 | 210 | 7 | |
| | | | | 310 | 550 | 200 | | |

[1] DTL=dibutyl tin dilaurate.
[2] DTA=dibutyl tin acetate.
[3] Control.

EXAMPLE 2

To demonstrate the bonding-sealing characteristics of the polymers of this invention, the third polymer listed in Table III and the first, second and fourth polymers listed in Table IV are designated as samples A, B, C and D respectively in the table below and were used to bond various substrates. All bonds are cured for 24 hours at room temperature, about 23° C. with exposure to atmospheric moisture. Results are summarized below.

| No. | Sample | Subtrate | Rating |
|---|---|---|---|
| 1 | B and D | Aluminum to aluminum | [1] E |
| 2 | B and D | Plywood to plywood | E |
| 3 | A | Steel to steel (acrylic lacquer primer) | E |
| 4 | A | Steel to steel-untreated surfaces | E |
| 5 | C | Glass to glass | E |
| 6 | A | Rubber to rubber | E |
| 7 | C | Wood to glass | E |
| 8 | C | Metal to glass | E |
| 9 | C | Wood to metal | E |
| 10 | C | Wet wood to wet wood | E |
| 11 | C | Cotton to cotton | E |
| 12 | A | Asphalt tile to wood | E |
| 13 | A | Asphalt tile to concrete | E |
| 14 | A | Linoleum to wood | E |
| 15 | A | Linoleum to concrete | E |
| 16 | A | Corlon tile to wood | E |
| 17 | A | Corlon tile to concrete | E |
| 18 | A | Ceramic tile to wood | E |
| 19 | A | Ceramic tile to sheet rock | E |
| 20 | A | Cellulose acetate to cellulose acetate | E |
| 21 | A | Phenolic to phenolic | E |
| 22 | A | Corning Pyrex to Pyrex | E |

[1] E=excellent.

Samples No. 1–4 and 6–10 are the same after exposure for 24 hours to −10° C. Sample No. 5 is the same after 1 hour in boiling water.

EXAMPLE 3

To demonstrate the hydrolytic stability of the polymers of this invention, the first polymer listed in Table V was immersed in water at 80° C. for 5 hours after being cured for 27 days. Results are summarized below.

| Days cured | 100% tensile modulus (p.s.i.) | Tensile strength (p.s.i.) | Percent elongation at break |
|---|---|---|---|
| 5 | 165 | 270 | 220 |
| 14 | 175 | 280 | 140 |
| 27 | 210 | 210 | 220 |
| 27 days plus 5 hours in H₂O at 80° C | 185 | 275 | 190 |

EXAMPLE 4

The general procedure of Example 1 is employed to prepare an isocyanate terminated polyurethane from five moles of POPG (molecular weight 2025) and six moles of methylene bis(diphenylisocyanate) having a molecular weight of 11,500. The polyurethane is then reacted as in Example 1, with 3% excess of aminopropyl trimethoxysilane to produce polymers having the following properties when cured to a rubbery material upon exposure to atmospheric moisture:

| 100% tensile modulus (p.s.i.) | Tensile strength (p.s.i.) | Percent elongation at break |
|---|---|---|
| 65 | 105 | 210 |
| 92 | 150 | 200 |

EXAMPLE 5

Into a 500 ml. three-neck flask equipped with metal stirrer, argon purge and thermometer was placed 300 g. of polycaprolactone, mole wt.=2000 (0.150 mole; 0.3000 equivalent of hydroxyl) 31.36 g. of TDI (0.180 mole) and 200 p.p.m. dibutyl tin dilaurate. This mixture was stirred at 85-90° C. until an isocyanate equivalent of 0.190 meq./g. was obtained. At this point, a stoichiometric quantity of aminopropyl trimethoxysilane was added and the reaction was continued until the isocyanate was consumed as determined by infrared spectroscopy (about 2 hours at 70° C.). Thereafter, 0.5 weight percent of dibutyl tin dilaurate was added to the mixture and blended until homogeneous.

The mixture crystallized on cooling but could be remelted repeatedly. Films drawn at 50-70° C. cured, on exposure to atmospheric moisture, to extremely tough cross-linked networks having the following physical properties (as determined on a ten mil film).

| | |
|---|---|
| Tensile modulus (p.s.i.) | 31,000 |
| Yield strength (p.s.i.) | 1,350 |
| Tensile strength (p.s.i.) | 3,750 |
| Yield elong. (percent) | 11 |
| Elong. at break (percent) | 620 |

The crystalline films and plaques on heating to 50° C. reverted to extremely tough elastomers, by virtue of the cross-linked network resulting from hydrolysis and condensation of the silicone end-groups.

EXAMPLE 6

To 88.3 g. of a 3600 molecular weight hydroxyl terminated copolycarbonate oligomer (obtained by phosgenating 165.0 g. of a 2000 molecular weight polycaprolactone diol and 19.0 g. of bisphenol-A) was added 5.70 g. of TDI (0.0654 isocyanate equivalents) and 1000 p.p.m. dibutyl tin dilaurate. The mixture was stirred at 80-90° C. for several hours at which time 2.94 g. (0.164 equivalents) of aminopropyl trimethoxysilane was added. The reaction was continued until all the silicone compound had reacted, after which 1% dibutyl tin dilaurate was added. The system was degassed and films and plaques prepared while the system was still molten. After exposure to atmospheric moisture for several days, the cured films and plaques displayed the following properties:

| | |
|---|---|
| Tensile modulus (p.s.i.) | 23,200 |
| Yield strength (p.s.i.) | 930 |
| Tensile strength (p.s.i.) | 1,470 |
| Yield elongation (percent) | 10 |
| Elongation at break (percent) | 218 |

EXAMPLE 7

To 204.8 g. of a two thousand molecular weight hydroxyl terminated polycaprolactone (0.2028 equivalents of hydroxyl) was added 23.7 g. of methyl cyclohexyl diisocyanate (96.3% purity) and 200 p.p.m. dibutyl tin dilaurate catalyst. The mixture was heated at 90° C. for about five hours after which time the isocyanate content was found to be 0.277 meq./g. by the dibutylamine method. A stoichiometric amount of aminopropyl trimethoxysilane, plus two percent excess, was added at 50° C. and after about one hour at 70° C. the isocyanate capped prepolymer was completely reacted as determined by the absence of isocyanate absorption in the infrared at 4.4 microns. At this point, 0.5% dibutyl tin dilaurate was added and the sample was cast into films and plaques.

The physical properties as determined on ten mil films after curing by exposure to atmospheric moisture for about one week were as follows:

| | |
|---|---|
| Tensile modulus (p.s.i.) | 512 |
| 100% modulus (p.s.i.) | 246 |
| 300% modulus (p.s.i.) | 841 |
| Tensile strength (p.s.i.) | 2,270 |
| Elongation at break (percent) | 472 |

EXAMPLE 8

1050 g. (1.033 equivalents of hydroxyl) of 2000 molecular weight polyoxypropylene glycol, 54.4 g. (.067 equivalents of hydroxyl) of 2500 molecular weight polyoxypropylene triol and 113.4 g. of TDI were mixed till homogeneous and 0.24 g. of dibutyl tin dilaurate was then added. After heating at 85-90° C. for three hours, the isocyanate content was 0.160 meq./g. The reaction was cooled to 50° C. and a stoichiometric quantity of aminopropyl triethoxysilane was added, plus five percent excess; stirring was continued at 50-65° C. for one hour until all isocyanate end-groups were consumed. Thereafter, 0.5% dibutyl tin dilaurate was added and films and plaques were exposed to atmospheric moisture to effect a cure. Cure rate with ethoxysilane terminated products was slower than with methoxy terminated materials.

Physical properties of these materials as determined on 10 mil films were as mollows:

| | |
|---|---|
| Tensile modulus (p.s.i.) | 150 |
| 100% modulus (p.s.i.) | 71 |
| 300% modulus (p.s.i.) | 185 |
| Tensile strength (p.s.i.) | 192 |
| Elongation at break (percent) | 315 |

EXAMPLE 9

The following compounds listed in Table VII are reacted to form isocyanate terminated polymers which are then reacted with the organosilicon compounds listed in Table VII to produce vulcanizable polymers that cure upon exposure to humid air.

TABLE VII

| Polyol | Polyisocyanate | Organosilicon compound |
|---|---|---|
| 1,6-hexanediol | Naphthalene-1,5-diisocyanate | $H_2N(CH_2)_3Si(OC_2H_5)_3$ |
| POPG | Hexamethylene diisocyanate | $HS(CH_2)_3Si(OCH_3)_3$ |
| Polycaprolactone | TDI | $H_2N(CH_2)_2Si(OC_2H_5)_3$ |
| POPG | Hexamethylene diisocyanate | $NH_2(CH_2)_3Si(OC_2H_5)_3$ |
| Mixture of polyethylene oxide and POPG | TDI | $H_2N(CH_2)_2NH(CH_2)_3Si(OCH_3)_3$ |
| Propylene glycol glucoside | Dianisidine diisocyanate | $HS(CH_2)_2Si(OCH_3)_3$ |
| Propylene oxide adduct of bisphenol A | Decamethylene diisocyanate | $HN(CH_2)_3Si(OCH_3)_3$<br>$\|$<br>$CH_3$ |

TABLE VII.—Continued

| Polyol | Polyisocyanate | Organosilicon compound |
|---|---|---|
| POPG | TDI | $H_2N(CH_2)_4Si(OC_3H_7)_3$ |
| Polytetramethylene glycol | Methylene bis(4-phenylisocyanate) | $H_2N(CH_2)_3Si(OCH_3)_3$ |
| $HO(CH_2)_2S[S(CH_2)_2OCH_2O(CH_2)_2S](CH_2)_2OH$ | m-Phenylene diisocyanate | $NH_2(CH_2)NH(CH_2)_3Si(OCH_3)_3$ |
| POPG | do | $H_2N(CH_2)_3Si(OC_2H_5)_3$ |
| POPG | 4,4′-diphenylmethane diisocyanate | $HS(CH_2)_3Si(OC_2H_5)_3$ |
| Polycaprolactone | TDI | $HN(CH_2)_4Si(OC_3H_7)_3$ <br> $\quad\mid$ <br> $\quad CH_3$ |
| POPG | TDI | $H_2N(CH_2)_6Si(OC_2H_5)_3$ |
| POPG | TDI | $HS(CH_2)_3Si(OCH_3)_3$ |
| Polycaprolactone | A mixture of 80% of 1-methyl-2,4-diisocyanate cyclohexane and 20% of 1-methyl-2,6-diisocyanate cyclohexane. | $H_2N-\overset{CH_3}{\underset{\mid}{C}}H-CH_2Si(OCH_3)_3$ |

Various modifications and variations of this invention will be obvious to a worker skilled in the art and it is understood that such modifications and variations are to be included within the purview of this application and the spirit and scope of the appended claims.

What is claimed is:

1. A vulcanizable silicon terminated organic polymer comprising the reaction product of an isocyanate terminated polyurethane prepolymer having at least two urethane linkages per polymer molecule and a silicon compound of the formula

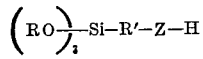

wherein R is a lower alkyl radical of from 1 to 6 carbon atoms, wherein R' is a divalent bridging group free of aliphatic unsaturation selected from the group consisting of a divalent hydrocarbon radical, a divalent hydrocarbon ether radical and a divalent hydrocarbon amino radical said bridging group having from 1 to 18 carbon atoms; and wherein Z is a member selected from the group consisting of —S—, and —NR''—, wherein R'' is hydrogen or a lower alkyl radical of from 1 to 6 carbon atoms, to provide the vulcanizable silicon terminated polymer with terminal end-blocking units of the formula

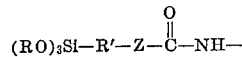

wherein R, R' and Z are the same as defined above.

2. A polymer as defined in claim 1 wherein said polyurethane is the reaction product of a polyoxyalkylene polyol and an aromatic diisocyanate.

3. A polymer as defined in claim 2 wherein the polyoxyalkylene polyol is polyoxyalkylene glycol and the aromatic polyisocyanate is toluene diisocyanate.

4. A polymer as defined in claim 1, wherein said polyurethane is the reaction product of a polyoxyalkylene diol, a polyoxyalkylene triol and an aromatic polyisocyanate.

5. A polymer as defined in claim 1 wherein said polyurethane is the reaction product of a polyhydroxypolycaprolactone and an aromatic polyisocyanate.

6. A polymer as defined in claim 1 admixed with a filler.

7. A polymer as defined in claim 1 admixed with a silanol condensation catalyst in an amount sufficient to cure said polymer upon exposure to moisture.

8. A composition as defined in claim 7 admixed with a filler.

9. A vulcanizable silicon terminated organic polymer having the general formula

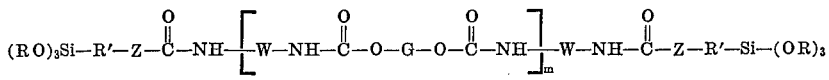

wherein R is a lower alkyl radical of from 1 to 6 carbon atoms, wherein R' is a divalent alkylene radical of from 1 to 8 carbon atoms; wherein Z is a member selected from the group consisting of —S—, —NH—, —NCH_3— and —NC_2H_5—, wherein W is a divalent alkylene radical of from 1 to 18 carbon atoms or a divalent aromatic radical of from 6 to 14 carbon atoms; wherein G represents the residue on removal of the terminal OH groups from a polyoxyalkylene glycol having a molecular weight of from about 580 to about 5800 and mixtures thereof, or a polyhydroxypolycaprolactone having a molecular weight of from about 450 to about 4500 and mixtures thereof and wherein m is an integer of at least one, said silicon terminated polymers having a molecular weight of from about 4000 to about 20,000 when G is said residue of polyoxyalkylene glycol and from about 2000 to about 20,000 when G is a said residue of a polyhydroxypolycaprolactone.

10. A polymer as defined in claim 9 wherein R is methyl or ethyl; wherein Z is —NH—; wherein W is tolylene.

11. A polymer as defined in claim 10, wherein G is the residue on removal of the terminal OH groups from a polyoxypropylene glycol.

12. A polymer as defined in claim 10 wherein G is the residue on removal of the terminal OH groups of a polyhydroxypolycaprolactone.

13. A polymer as defined in claim 11 admixed with a filler and a silanol condensation catalyst in an amount sufficient to cure said polymer upon exposure to moisture.

14. A polymer as defined in claim 12 admixed with a filler and a silanol condensation catalyst in an amount sufficient to cure said polymer upon exposure to moisture.

15. The cured polymer of claim 1.
16. The cured polymer of claim 2.
17. The cured polymer of claim 3.
18. The cured polymer of claim 4.
19. The cured polymer of claim 5.
20. The cured composition of claim 6.
21. The cured composition of claim 7.
22. The cured composition of claim 8.
23. The cured polymer of claim 9.
24. The cured polymer of claim 10.
25. The cured polymer of claim 11.
26. The cured polymer of claim 12.
27. The cured composition of claim 13.
28. The cured composition of claim 14.

(References on following page)

References Cited

UNITED STATES PATENTS 3,309,261 3/1967 Schiller et al. _____ 260—46.5 X
3,453,243 7/1969 Hartlein _____ 260—77.5

DONALD E. CZAJA, Primary Examiner
M. J. WELSH, Assistant Examiner

U.S. Cl. X.R.

260—37 N, 46.5 E, 75 NH, 77.5 AN, 77.5 AP